June 20, 1950      E. G. GARTIN      2,512,149
WORKING IMPLEMENT RETAINER
Filed Feb. 21, 1947
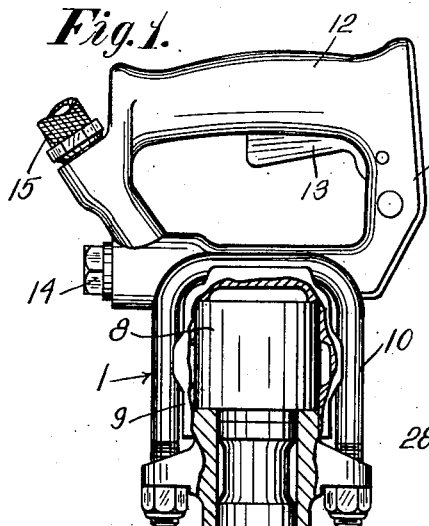
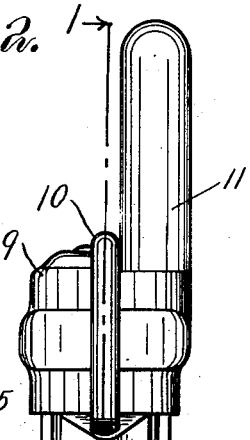
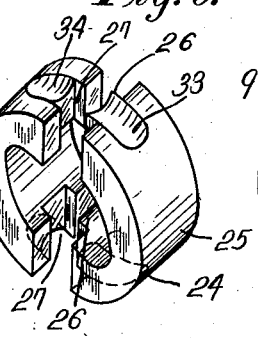
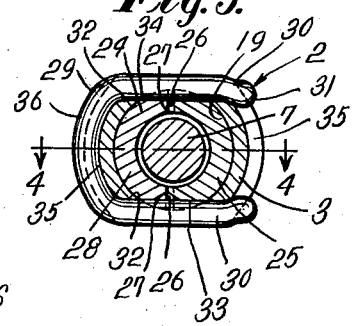
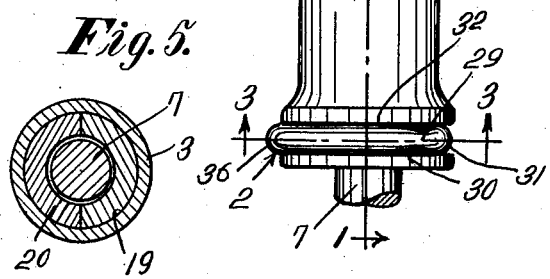
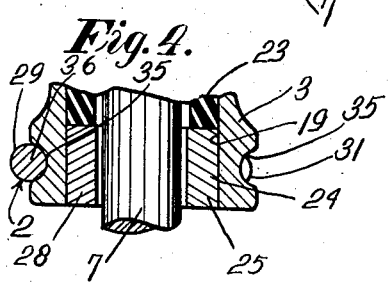
Inventor:
Elmer G. Gartin
by Charles F. Osgood,
Attorney.

Patented June 20, 1950

2,512,149

UNITED STATES PATENT OFFICE 2,512,149

WORKING IMPLEMENT RETAINER

Elmer G. Gartin, Claremont, N. H., assignor to Joy Manufacturing Company, a corporation of Pennsylvania Application February 21, 1947, Serial No. 729,994

12 Claims. (Cl. 279—19.5)

This invention relates to working implement retainers and more particularly to an improved retainer for the working implement of a pressure fluid actuated percussive tool.

In pressure fluid actuated percussive tools, such as a clay spader, the spade is usually provided with a collared shank which is inserted in the tool chuck, and the shank is loosely held in the chuck by a retainer which cooperates with the collar of the shank. Such a retainer must be releasable to permit the collar and shank to be withdrawn from or inserted into the tool chuck. Heretofore various kinds of retainers for spaders or similar percussive tools have been employed for this purpose, but all lack the feature of being readily releasable, which is extremely desirable in a clay spader or similar tool and, in most instances, the tool must be partially dismantled to permit release of the collar and shank from the tool chuck.

It is accordingly an object of the present invention to provide an improved working implement retainer which may be readily released without dismantling parts of the percussive tool. Another object is to provide an improved working implement retainer for a percussive tool whereby the collared shank of the working implement may be readily inserted into and locked in the tool chuck. A further object is to provide an improved retainer for the collared shank of a working implement and having retainer means for effectively locking the shank in the tool chuck, such retainer means being readily releasable at will simply by removing the retainer parts through the forward open end of the tool casing without the necessity of dismantling the tool itself. Yet another object is to provide an improved working implement retainer wherein a front split retainer ring is placed about the body of the working implement in advance of the shank collar and then inserted into and locked in a forwardly opening bore in the tool casing. A still further object is to provide an improved releasable lock for holding the split retainer ring in operative position in the casing bore. A still further object is to provide an improved releasable U-shaped lock engaging the tool casing and the split retainer ring parts for holding the retainer ring in operative retaining position in the tool casing. These and other objects and advantages of the invention will, however, hereinafter more fully appear.

In the accompanying drawing there is shown for purposes of illustration one form which the invention may assume in practice.

In this drawing:

Fig. 1 is a view in central longitudinal section taken on line 1—1 of Fig. 2, showing a percussive tool equipped with an illustrative form of the improved working implement retainer.

Fig. 2 is a side elevational view of the percussive tool shown in Fig. 1.

Fig. 3 is a cross-sectional view taken on line 3—3 of Fig. 2, showing the lower retainer ring and ring lock.

Fig. 4 is a view in central longitudinal section taken on line 4—4 of Fig. 3.

Fig. 5 is a cross-sectional view taken on line 5—5 of Fig. 1, showing the upper retainer ring.

Fig. 6 is a perspective view of the lower split retainer ring with the ring parts slightly separated to show the interlock between the parts.

In this illustrative construction, there is shown a pressure fluid actuated percussive tool, generally designated 1, having the improved working implement retainer, generally designated 2, embodied therein. The percussive tool is herein of the kind known as a clay spader, although it will be evident that the improved retainer may be embodied in tools of other types.

The percussive tool 1 comprises a motor cylinder casing 3 having a bore containing a reciprocatory hammer piston 4 provided with a front striking nose 5 adapted to deliver impact blows to the shank 6 of a working implement 7, herein a spade. Attached to the rear end of the motor casing is an automatic fluid distributing valve mechanism 8 of a conventional design for distributing pressure fluid to the opposite ends of the motor cylinder to effect reciprocation of the hammer piston. This valve mechanism is arranged in a bore in a rear head 9 attached to the rear end of the motor casing by a U-bolt 10. Projecting rearwardly from the rear head is a handle 11 laterally offset from the axial center of the tool and formed with a transverse grasping portion 12 by which the tool may be supported and manipulated. Pivoted on the handle is a usual trigger 13 for actuating a conventional throttle valve mechanism 14 for controlling the flow of pressure fluid from a supply hose 15 to the fluid distributing valve mechanism 8 in a manner well known to those skilled in the art. Formed within the forward portion of the cylinder casing of the tool is a bore 16 in which there is supported a chuck bushing 17, having a polygonal axial opening for receiving the polygonal shank 6 of the working implement, and formed on the body of the working implement in advance of the shank is a collar 18 which rests against the forward end of the chuck bushing 17 when the tool shank is in its rearmost position in the tool chuck. The bore 16 at its forward end opens into an enlarged bore 19 in the tool casing, and arranged in this bore is an upper or rear retainer or impact ring 20 which is split into two identical parts to enable placing thereof around the body of the working implement in advance of the shank collar 18. This upper retainer ring engages a shoulder 21 at the rear end of the bore 19 and provides a rearward facing abutment surface 22 with which the forward side of the shank collar 18 is engageable during operation of the tool. Arranged in the bore 19 in advance of the upper retainer ring is an annular rubber buffer 23, and also arranged in the bore 19 in advance of the buffer is a lower or front retainer ring 24 which is likewise split into two parts to enable placing thereof about the body of the working implement in advance of the shank collar. One of the parts 25 of the lower retainer ring has projections 26 which are received in slots 27 in the other ring part 28 so that the two parts may be firmly interlocked together while readily permitting lateral separation of the parts. The lower retainer ring is held in position in the bore of the tool casing by a U-shaped lock 29 having leg portions 30, 30, the latter terminating at the outer ends in inwardly bent portions 31. The opposite sides of the tool casing are transversely grooved at 32, and these grooves cut through the side walls of the casing into the bore 19; and the parts of the lower retainer ring are grooved at 33 and 34 respectively, to receive the leg portions 30 of the U-lock in the manner shown in Fig. 3. The tool casing is arcuately grooved at 35 at its diametrically opposite sides from the grooves 32, and one of the grooves 35 receives the base 36 of the U-lock while the opposite groove 35 receives the inwardly bent portions 31 of the lock-legs 30, thereby to lock the U-lock in its operative locking position. The grooves 32 and 35 are symmetrically arranged on the tool casing so that the U-lock may be placed in locking position at either side of the tool. In the construction shown, each leg of the U-lock engages both parts 25, 28 of the split lower retainer ring 24, thereby firmly to hold the retainer ring in position in the front bore of the tool casing.

The manner of use of the improved working implement retainer will be clearly apparent from the description given. When the parts are in their operative retaining position shown in Fig. 1 and the hammer piston 4, upon admission of pressure fluid to the motor cylinder, is operated percussively to actuate the working implement by delivering impact blows to the shank 6, the working implement shank is rapidly reciprocated in the tool chuck. The working implement, during reciprocation thereof, strikes against the rearwardly facing surface of the upper retainer ring 20, and the shock of the impacts transmitted to the upper retainer ring is, to a large extent, absorbed by the buffer ring 23, which is seated against the lower retainer ring, the latter being rigidly locked to the tool casing. When it is desired to remove the shank of the working implement from the tool chuck, the U-lock 29 may be laterally released from the tool casing, thereby to permit forward withdrawal of the lower retainer ring 24 from the front bore 19 of the tool casing, and the lower retainer ring, due to its split construction, may be readily detached from the body of the working implement. The rubber buffer 23 and the upper retainer ring 20 may then be withdrawn with the tool shank from the front casing bore 19; and the upper retainer ring, due to its split construction, likewise may be readily removed from the body of the working implement. The rubber buffer 23, due to its inherent resiliency, may be removed from the body of the working implement simply by passing the same rearwardly over the collar 18 and from the implement-shank 6. Upon insertion of the shank of the working implement into the tool chuck, the rubber buffer is placed in position over the shank collar about the body of the implement and the parts of the upper retainer ring placed about the implement body in advance of the shank collar, and then inserted rearwardly into the front bore of the tool casing. The front retainer ring is then placed about the body of the implement and inserted in the front casing bore 19 and locked in position by the U-lock 29 in the manner shown in Fig. 1.

As a result of this invention, an improved working implement retainer is provided for a percussive tool wherein the retainer parts may be readily inserted and locked in position within a forward bore in the tool casing without the necessity of dismantling any parts of the tool itself. By the provision of the improved front retainer ring structure and the associated locking means, the shank of the working implement may be effectively locked in the tool chuck, and the locking means, due to its improved construction, may be quickly released, readily to permit forward removal of the retainer parts from the front bore of the tool casing. By the provision of the U-shaped lock engaging both of the cooperating parts of the front retainer ring, the latter is firmly held in position in the front bore of the tool casing. By interlocking the cooperating parts of the front retainer ring together, an extremely rugged construction is obtained. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a percussive tool including a tool casing having a bore opening through the front end thereof, a chuck in said tool casing for receiving the collared shank of a working implement, a split front retainer ring slidably received in said casing-bore and embracing the body of the working implement in advance of the shank collar for retaining the working implement shank in said chuck, and releasable locking means engaging the tool casing and said retainer ring for locking the latter in said bore, said locking means being readily releasable to permit free forward axial withdrawal of said retainer ring and the implement shank from said casing-bore.

2. In combination, a percussive tool including a tool casing having a bore opening through the front end thereof, a chuck in said tool casing for receiving the collared shank of a working implement, a split front retainer ring slidably received in said casing-bore and embracing the body of the working implement in advance of the shank collar for retaining the working implement shank in said chuck, and releasable locking means engaging the tool casing and both parts of said retainer ring for locking the latter in said casing-bore, said locking means being readily releasable to permit free forward axial withdrawal of said retainer ring and the implement shank from the casing-bore.

3. In combination, a percussive tool including a tool casing having a bore opening through the front end thereof, a tool chuck in said casing for receiving the collared shank of a working implement, and retainer means for retaining the implement-shank in the tool chuck comprising a split retainer ring slidably fitted in said casing-bore and embracing the body of the working implement in advance of the shank collar for retaining the working implement shank in said chuck, and means for locking said retainer ring in said casing-bore comprising a groove in said casing opening into said bore, a slot on the retainer ring and a releasable locking element having a portion received in said casing-groove and projecting into said ring-slot, said locking element being readily releasable to permit free forward axial withdrawal of said retainer ring and the implement shank from the casing-bore.

4. In combination, a percussive tool including a tool casing having a bore opening through the front end thereof, a tool chuck in said casing for receiving the collared shank of a working implement, and retainer means for retaining the implement-shank in said tool chuck comprising a split retainer ring slidably fitted in said casing-bore and embracing the body of the working implement in advance of the shank-collar for retaining the working implement shank in said chuck, and means for locking said retainer ring in said casing-bore comprising grooves formed at the opposite sides of said casing and opening into said casing-bore, slots in the opposite sides of said retainer ring and a U-shaped locking member having leg portions received in said grooves and projecting into said slots, said locking member being withdrawable laterally from said casing to bring said leg portions out of said ring-slots to permit free forward axial withdrawal of said retainer ring and the implement shank from said casing-bore.

5. In combination, a percussive tool including a tool casing having a bore opening through the front end thereof, a tool chuck in said casing for receiving the collared shank of a working implement, and retainer means for retaining the implement-shank in the tool chuck comprising a split retainer ring slidably fitted in said casing-bore and embracing the body of the working implement in advance of the shank collar for retaining the working implement shank in said chuck, and means for locking said retainer ring in said casing-bore comprising a U-shaped locking member having leg portions parallel grooves in opposite sides of said tool casing opening into said bore, and slots in the parts of said retainer ring, said leg portions being received in said grooves and projecting into said slots, said locking member being withdrawable laterally from the tool casing to bring said leg portions out of said slots to permit free forward axial withdrawal of said retainer ring and the implement shank from said casing-bore.

6. In combination, a percussive tool including a tool casing having a bore opening through the front end thereof, a tool chuck in said casing for receiving the collared shank of a working implement, and retainer means for retaining the implement-shank in the tool chuck comprising a split retainer ring slidably fitted in said casing-bore and embracing the body of the working implement in advance of the shank collar for retaining the working implement shank in said chuck, and means for locking said retainer ring in said casing-bore comprising a U-shaped locking member having leg portions, parallel grooves in opposite sides of said tool casing opening into said bore, and slots in the parts of said retainer ring, said leg portions being received in said grooves and projecting into said slots, and said leg portions having inwardly bent ends which are adapted to snap inwardly against the sides of said casing yieldingly to hold said locking member in locking position, said locking member being withdrawable upon outward springing of said bent-ends laterally from said casing to bring said leg portions out of said slots to permit free forward axial withdrawal of said retainer ring and the implement shank from said casing-bore.

7. A working implement retainer for a percussive tool having a front bore comprising a front retainer ring of split construction slidably receivable in said bore and adapted to embrace the body of a working implement in advance of the shank collar for retaining the working implement in operating position, one of said ring parts having projections received in slots in the other ring part and cooperating to provide an interlock for interlocking said parts together, said interlock precluding relative movement of said ring parts axially of said ring while permitting free lateral separation of said parts when said ring is removed from the tool-bore.

8. A working implement retainer for a percussive tool comprising a front retainer ring of split construction adapted to embrace the body of a working implement in advance of the shank collar for retaining the working implement in operating position, one of said ring parts having projections received in slots in the other ring part to provide an interlock for interlocking said parts together, said interlock precluding separation of said ring parts axially of said ring while permitting free lateral separation of said ring parts, and slots on the exterior of said ring parts adapted for engagement by locking means when said ring parts are interlocked together.

9. In combination, a percussive tool including a tool casing having a bore opening through its forward end, a chuck in said tool casing for receiving the collared shank of a working implement, an upper split retainer ring slidably received in said casing-bore in advance of the shank collar and with which the collar is engageable during reciprocation of the working implement, a rubber buffer slidingly fitted in said bore in advance of said upper ring, a lower split retainer ring slidably received in said casing-bore in advance of said buffer for holding the latter and said upper ring in operative position in said casing-bore, and a releasable lock for locking said lower ring in position in said casing-bore, said lock being readily releasable to permit free forward axial withdrawal of the retainer parts and the implement shank from said casing-bore.

10. A working implement retainer, comprising a casing having a smooth-walled bore and adapted to receive the collared shank of a working implement, a split retainer ring slidably received in said casing-bore and embracing the body of the implement in advance of the shank collar for retaining the working implement shank in said casing, and a releasable lock engaging said casing and said ring for locking the latter in said casing-bore, said ring being freely axially withdrawable forwardly from said bore upon release of said lock.

11. A retainer for the reciprocable working implement for a percussive tool, comprising a front retainer ring of split construction adapted to embrace the body of the working implement in advance of the shank collar to prevent ejection of the working implement from the tool, said retainer ring adapted to receive the impact blows of the working implement when the latter is out of operating contact with the work, said retainer ring comprising semi-circular parts adapted to be placed in contact in mutually opposed relation to form the ring, and each part having external slots near their points of contact adapted for engagement with locking means.

12. A percussive tool including a tool casing having a bore, a split retainer ring slidably receivable in said bore and adapted to embrace the body of a reciprocable working implement in advance of the shank collar to prevent ejection of the working implement from the tool casing, said ring comprising semi-circular parts adapted to be placed together in mutually opposed relation to form a ring, said parts each having external slots near their points of contact, said casing being transversely grooved at points adjacent to said slots and into which grooves said ring slots open when said ring is fitted in said bore, and a U-shaped lock arranged transversely of said casing and having leg portions received in said casing-grooves and engaged in said ring slots with each leg portion coacting with a pair of slots on both ring parts.

ELMER G. GARTIN.

REFERENCES CITED

The following references are of record in the file of this patent:

UNITED STATES PATENTS

| Number | Name | Date |
|---|---|---|
| 626,762 | Leyner | June 13, 1899 |
| 890,808 | Smith | June 16, 1908 |
| 941,748 | Wallace | Nov. 30, 1909 |
| 1,142,238 | Cook | June 8, 1915 |
| 1,757,093 | Norling | May 6, 1930 |
| 1,774,905 | Smrdel | Sept. 2, 1930 |
| 1,969,798 | Hultquist | Aug. 14, 1934 |
| 2,201,485 | Forss | May 21, 1940 |

FOREIGN PATENTS

| Number | Country | Date |
|---|---|---|
| 1,234 | Great Britain | Jan. 17, 1911 |

Certificate of Correction

Patent No. 2,512,149 — June 20, 1950

ELMER G. GARTIN

It is hereby certified that error appears in the printed specification of the above numbered patent requiring correction as follows:

Column 8, line 28, list of references cited, under the heading "FOREIGN PATENTS", for the number "1,234" read *1,236*;

and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*